United States Patent [19]

Bergstrom

[11] Patent Number: 5,142,915
[45] Date of Patent: Sep. 1, 1992

[54] METHOD FOR FABRICATION OF FORCE SENSING ELEMENTS BY LAMINATING DIELECTRIC TAPE

[75] Inventor: John S. Bergstrom, Williamsburg, Va.

[73] Assignee: Siemens Automotive L.P., Auburn Hills, Mich.

[21] Appl. No.: 549,327

[22] Filed: Jul. 6, 1990

[51] Int. Cl.$^5$ .......................... G01L 1/22; G01L 9/06
[52] U.S. Cl. .................................... 73/727; 29/621.1; 73/862.627; 338/47
[58] Field of Search ................ 73/706, 708, 719, 720, 73/721, 725, 726, 727, 729, 746, 754, 756, DIG. 4, 862.47, 862.48, 862.62, 862.63, 862.64, 862.65, 862.67; 29/621.1; 338/4

[56] References Cited

U.S. PATENT DOCUMENTS

| 4,522,067 | 6/1985 | Burger et al. | 73/726 |
| 4,548,086 | 10/1985 | Käster | 73/726 |
| 4,894,635 | 1/1990 | Yajima et al. | 338/4 |

OTHER PUBLICATIONS

Sawhill, Eustice, Horowitz, Gar-El and Travis, "Low Temperature Co-Firable Ceramics with Co-Fired Resistors".
Glas, Kuhnt, Stecher; "Integrated Hybrid Pressure Sensor Using A Piezoresistive Thickfilm Sensor Element"; SAE International Congress 1987, Paper 870286.
DuPont Electronics, "Streamline Processing with DePont's Tape on Substrate System".
A. L. Eustice, S. J. Horowitz, J. J. Stewart, A. R. Travis and H. T. Sawhill, "Low Temperature Co-Fireable Ceramics: A New Approach for Electronic Packaging"; 36th Electronics Component Conference, (1986), Proceedings, pp. 37–47.

Primary Examiner—Donald O. Woodiel
Attorney, Agent, or Firm—George L. Boller; Russel C. Wells

[57] ABSTRACT

Unfired ceramic tape is fired to a ceramic substrate during the laminar fabrication of a thick film force sensing element to provide the fabricated sensing element with a force sensing zone which is effective in response to the application of force thereto to induce strain in the fired ceramic tape. A conductor and thick film resistor system is printed and fired to the tape during the fabrication process to provide the fabricated sensing element with an electrically detectable signal correlating with the induced strain. Accelerometer and pressure sensor embodiments are disclosed. The invention is well-suited for the commercial mass-production of sensing elements, such as for automotive vehicle usage, because it can practiced through the use of automated production processes.

21 Claims, 2 Drawing Sheets

METHOD FOR FABRICATION OF FORCE SENSING ELEMENTS BY LAMINATING DIELECTRIC TAPE

BACKGROUND AND SUMMARY OF THE INVENTION

This invention relates generally to force sensors, such as pressure sensors and accelerometers by way of example, and more specifically it relates to a method for fabrication of thick film resistor force sensing elements used in such sensors.

A paper entitled, "Integrated Hybrid Pressure Sensor Using A Piezoresistive Thickfilm Sensor Element", SAE International Congress 1987, Paper 870286, by H.J. Glas, W. Kuhnt, G. Stacher, discloses certain methodology relating to the fabrication of a pressure sensing element for use in a pressure sensor. A copy of that paper is attached to the accompanying Information Disclosure Statement.

The present invention represents a methodology which possesses significant cost and performance advantages over prior technology for the fabrication of piezoresistive thick film force sensing elements. One of the unique features of the methodology of the present invention relates to the use of unfired ceramic tape as one of the components from which a force sensing element of this particular type is fabricated. Such tape is a conventional commercial product, an example of which is Dupont Electronics "Green Tape" TM system. A copy of descriptive material from Dupont Electronics is also attached to the accompanying Information Disclosure Statement. A generic definition of "Green Tape" is a sheet of unfired ceramic material. The material is flexible in this state. The tape can be stamped in the unfired condition and then fired at a high temperature to finish the product. The tape is fabricated by tape casting a slurry of ceramic and binders. This process is used for fabricating hybrid thick film substrates and ceramic multi-layer capacitors.

Also enclosed as a part of the Information Disclosure Statement is a paper entitled, "Low Temperature Co-fireable Ceramics: A New Approach For Electronic Packaging", 36th Electronics Component Conference (1986), Proceedings, pp 37–47 by A.L. Eustice, S.J. Stewart, A.R. Travis, and H.T. Sawhill. Another paper, "Low Temperature Co-fireable Ceramics With Co-fired Resistors" by H.T. Sawhill, A.L. Eustice, S.J. Horowitz, J. Gar-El and A.R. Travis is also attached to the Information Disclosure Statement.

As one can see from consideration of the state of the art represented by the documentation included with the Information Disclosure Statement, no-one has heretofore recognized the possibility of using unfired ceramic tape in the fabrication of piezoresistive thick film force sensing elements for pressure sensors, accelerometers, or other force sensors, in such a manner that in the completed sensing element, a portion of the fired tape forms a deflectable force sensing zone, and wherein a conductor and thick film resistor system printed and fired onto the ceramic tape is disposed in relation to the force sensing zone such that a characteristic of the system provides a signal which correlates with the force applied to the force sensing zone.

The fabricated sensing element is adapted to be a principal component part of a force sensor. The typical force sensor comprises a suitable construction for the mechanical mounting of the force sensing element in such a manner that the force sensing zone thereof is properly disposed to sense the force of interest, and also for the electrical connection of the conductor and resistor system with electrical terminal structure of the sensor such that the sensor can be connected in an electric circuit to provide an electric signal representation of force applied to the force sensing zone of the sensing element.

Principles of the invention will be disclosed in the ensuing detailed description of a presently preferred embodiment in accordance with the best mode contemplated at the present time for carrying out the invention. Drawings (not necessarily to scale or relative proportions) accompany the disclosure and are identified as follows:

DESCRIPTION OF PREFERRED EMBODIMENT

Figure 1:
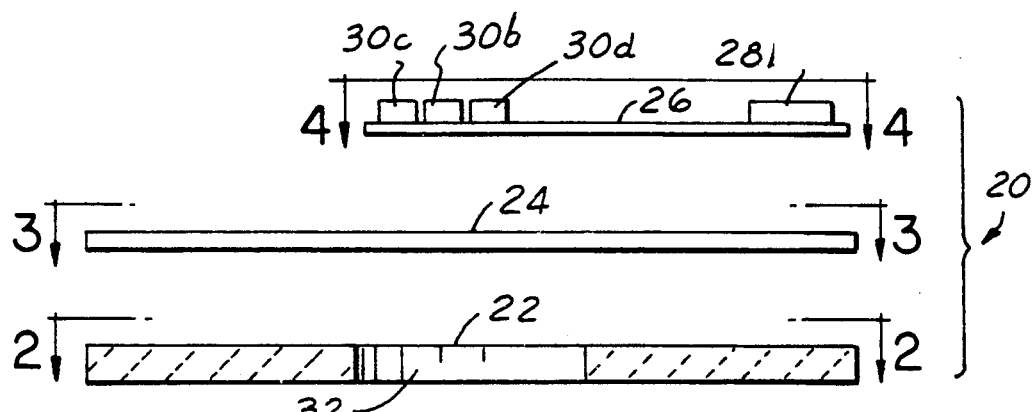
FIG. 1 is an exploded elevational view, in partial cross section, useful in explaining principles of the invention.
Figure 7:
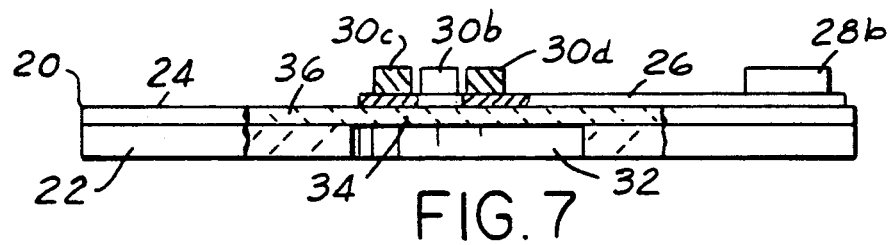
FIG. 7 is a view in partial cross section and looking in the same direction as the view of FIG. 1 illustrating the finished force sensing element.

FIGS. 1–7 illustrate principles of the invention in the fabrication of a pressure sensing element 20. The completed element 20 depicted in FIG. 7 is a lamina comprising a ceramic substrate 22, a ceramic tape 24, and a conductor and resistor system 26. Substrate 22 is a suitable ceramic material, such as 96% alumina by way of example (96% $Al_2O_3$). Ceramic tape 24 is a dielectric material, such as that described in the aforementioned Dupont Electronics literature. Conductor and resistor system 26 comprises a conductor pattern 28, palladium/silver (Pd/Ag) conductor for example, and a piezoresistive thick film resistor pattern 30.

Substrate 22 is provided with a through-hole 32 which, by way of example, is centrally located and of circular shape. In the fabricated element of FIG. 7, substrate 22 and tape 24 are united in face-to-face relationship except for a central circular zone 34 of the tape that covers hole 32 and, as such, forms a pressure-responsive circular diaphragm whose perimeter is supported on the substrate by an integral adjoining annular marginal zone 36 that is fired to the substrate. Stated another way, the diaphragm is supported from and overhangs the entire endless edge of the through-hole.

The creation of pressure differential across pressure-responsive zone 34 results in corresponding deflection of the diaphragm and the inducement of correlated strain in the fired ceramic tape. The thick film resistor pattern 30 exhibits a characteristic which correlates with the induced strain resulting from diaphragm deflection, and hence correlates with the pressure differential acting across the diaphragm.

Figure 4:
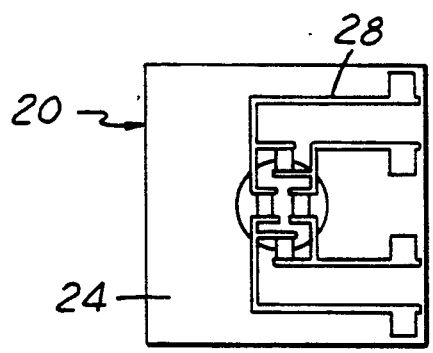
FIG. 4 is a full view taken in the direction of arrows 4—4 in FIG. 1.
Figure 5:
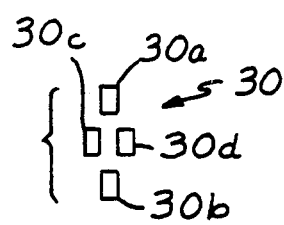
FIGS. 5 and 6 are respective views looking in the same direction as the view of FIG. 4 useful in explaining certain steps in the practice of the invention.
Figure 6:
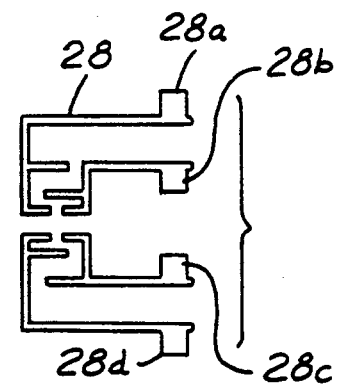

FIGS. 4, 5 and 6 illustrate that system 26 has a Wheatstone bridge configuration of the individual resistor elements 30a, 30b, 30c, 30d of pattern 30 and includes corresponding pads 28a, 28b, 28c, 28d in conductor pattern 28. Resistor pattern 30 is disposed on the surface of tape 24 opposite hole 32 such that two diametrically opposite resistor elements 30a, 30b are placed at the edge of hole 32 while the two other resistor elements 30c, 30d are arranged at 90 degrees to the first pair and in a more radially inward disposition near the center of hole 32. Individual wires (not shown) provide electrical connection of the respective pads with respective electrical terminals of the sensor (not shown) in which the sensing element is mounted. When put to use, the sensor is connected by means of such terminals with those of a mating connector (not shown) of an electric circuit with which the pressure sensor is used. In this way, the pressure sensing element provides to the electric circuit, a signal indicative of pressure differential across zone 34.

Principles of the invention involve the use of ceramic tape 24 in unfired form. One way of fabricating the laminar sensing element is by firing the unfired tape 24 to substrate 22, then, after the firing has been completed, printing conductor and resistor system 26 onto the fired tape, and then, firing the conductor and resistor system onto the tape. Alternatively, the conductor and resistor system can be printed onto the unfired tape, and then the unfired tape and the unfired conductor and resistor system can be co-fired in a single firing step, as distinguished from a two-step sequential firing.

Fabrication of a pressure sensing element has been conducted by laminating unfired ceramic tape of 0.002 inch–0.003 inch thickness to a 0.025 inch thick 96% alumina substrate. The substrate had a 4 mm laser-machined hole 32. This lamina of substrate and unfired ceramic tape was then fired at 850° C. in a conventional thick film furnace. Next, a Wheatstone bridge network composed of a Pd/Ag conductor and Dupont Series 1700 resistor system was printed and fired onto the tape. The bridge consisted of two resistor elements located toward the center of the diaphragm and two along the hole edge, as explained above. The substrate was mounted on plastic housing structure for pressure testing, and electrical leads were attached with silver epoxy. Therefore, the fabricated sensing element comprised a ceramic diaphragm, 0.002 inch to 0.003 inch thick and 4 mm in diameter, supporting a Wheatstone bridge circuit having an output inversely proportional to the pressure-induced strain in the diaphragm. The sensor was tested from 50 mm to 650 mm mercury (Hg) pressure and was temperature characterized. The output was found to be linear, and the temperature sensitivity of the offset voltage was found to be low. The offset voltage with a 5 volt input voltage was found to be approximately 145 mV at 25° C. and pressure sensitivity approximately −0.007 mV/mm Hg. The temperature sensitivity of the offset voltage was −0.010 mV/° C. from 125° C. to 25° C., and −0.0193 mV/° C. from 25° C. to −40° C.

Figure 8:
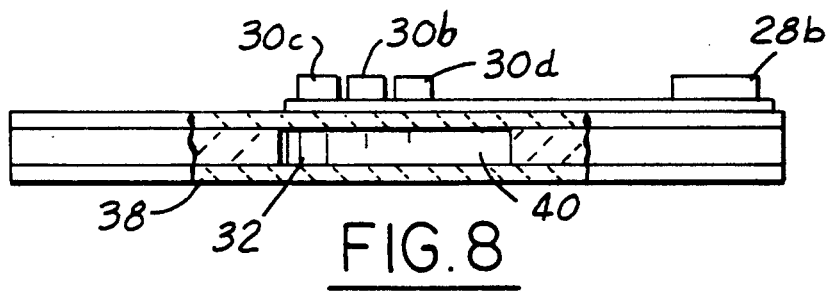
FIG. 8 is a partial cross sectional view similar to FIG. 7 illustrating a second embodiment.

It is fully contemplated that other embodiments of pressure sensing elements can also be fabricated in accordance with the inventive principles. For one, substrate 22 can, itself, be fabricated as a lamina of ceramic tape. For another, the sensing element can be fabricated to have a totally enclosed volume forming a reference pressure space. An example of this construction is portrayed in FIG. 8 where a further ceramic tape layer 38 has been fired to the face of substrate 22 opposite the face to which tape 24 has been fired. This provides an enclosed volume 40 of cylindrical shape at a known reference pressure.

Figure 9:
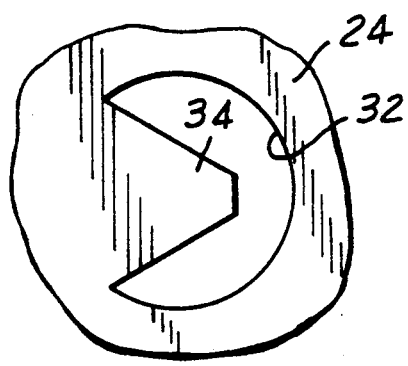
FIGS. 9 and 10 are respective fragmentary views looking in the same direction as the view of FIG. 4 but illustrating respective third and fourth embodiments.
Figure 10:
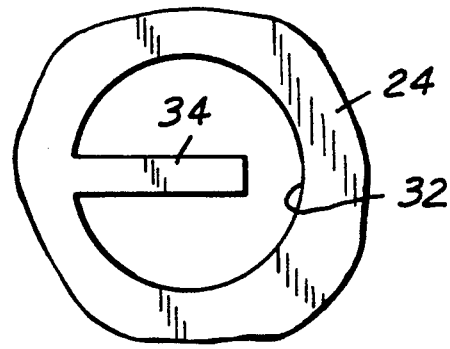
Figure 2:
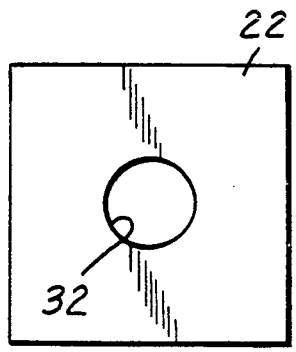
FIG. 2 is a full view taken in the direction of arrows 2—2 in FIG. 1.
Figure 3:
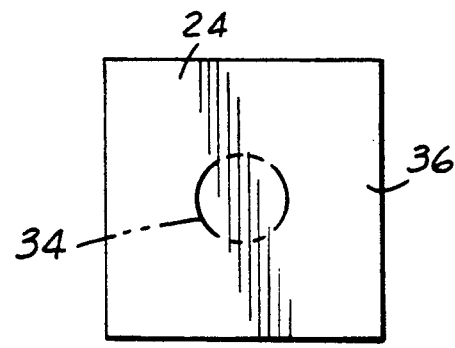
FIG. 3 is a full view taken in the direction of arrows 3—3 in FIG. 1.

Another form of force sensor which can be fabricated in accordance with principles of the invention is an accelerometer. Two examples of accelerometer force sensing elements are portrayed in FIGS. 9 and 10. The process for fabricating the force sensing elements is like that previously described in connection with the fabrication of the illustrated pressure sensing element of FIGS. 1–7. The arrangement of the thick film resistor system is, however, different because the accelerometer element no longer has a diaphragm covering hole 32. Rather, the force sensing zone 34 of ceramic tape 24 is in the form of a cantilever that projects over hole 32 from a particular location along the edge of the hole. The strain-sensing resistors are located in a high stress region of the cantilever. The cantilever is fabricated by removing a complementary portion of the tape material overlying hole 32. Laser machining is a suitable way to remove the unwanted material. FIGS. 9 and 10 show two different shapes of cantilever.

One advantage of the construction is that the ceramic tape and/or thick film can be laser trimmed for adjustment. The laminating of ceramic materials is a mature technology, and therefore, the invention possesses the further advantage of adaptability to automated processing, which is highly important for commercial mass-production fabrication of sensors used in automotive vehicle applications, such as crash sensors, fluid pressure sensors, etc. Of course, principles of the invention are not limited to any particular commercial usage of a sensor embodying a force sensing element constructed in accordance therewith. Given the disclosure contained herein, those skilled in the art can utilize known design and fabrication practices to design and fabricate various forms of sensing elements embodying the principles of the invention. This should not be construed however to imply that compliance can be attained with every possible specification; some specifications may be impossible to comply with for any of several reasons, such as the extent to which the fired tape can be stressed without fissure or fracture.

While a preferred embodiment has been disclosed for the practice of principles of the invention, such principles may also be practiced in other equivalent embodiments falling within the scope of the following claims.

What is claimed as the invention is:

1. Method for fabrication of a force sensing element for use in a force sensor which comprises the steps of:
   A) providing unfired ceramic tape;
   B) fabricating a lamina which includes said tape by
      i) disposing a conductor and thick film resistor system on said tape;
      ii) disposing said tape on a ceramic substrate;
      iii) firing
         a) said system to said tape, and
         b) said tape to said substrate;
   C) wherein during the fabrication process, a portion of said tape is disposed to overhang an edge portion of said substrate and thereby provide a force sensing zone which, in the fabricated sensing element, is effective to induce measurable strain in said tape in response to force acting on said zone, and D) wherein during the fabrication process, said system is disposed on said tape so as to be effective, in the fabricated sensing element, to measure strain induced in said tape in response to force acting on said zone and thereby provide a signal thereof which is capable of electrical detection.

2. Method according to claim 1 wherein said substrate is fabricated by laminating layers of unfired ceramic tape and then firing them.

3. Method according to claim 1 wherein the firing of said system to said tape and of said tape to said substrate is conducted in a single co-firing step.

4. Method according to claim 1 wherein the firing of said system to said tape and of said tape to said substrate are conducted as separate sequential steps.

5. Method according to claim 1 wherein said substrate comprises a through-hole, said edge portion of said substrate comprises at least a portion of the edge of said through-hole, and said zone overlies said through-hole.

6. Method according to claim 5 wherein said through-hole's edge is endless, said zone fully covers said through-hole, and said zone is supported by an annular marginal zone of said tape bounding said through-hole.

7. Method according to claim 6 wherein said through-hole is circular.

8. Method according to claim 5 wherein the thick film resistor portion of said system is disposed on said zone.

9. Method according to claim 8 wherein said thick film resistor portion and said conductor portion of said system are arranged on said tape to cooperatively form a Wheatstone bridge, with two diametrically opposite thick film resistor elements disposed at the edge of said through-hole and with two other diametrically opposite thick film resistor elements arranged at 90 degrees to the first-two-mentioned resistor elements and disposed more radially inwardly toward the center of said through-hole, said four resistor elements being disposed on the opposite side of said tape from said through-hole.

10. Method according to claim 5 including uniting another ceramic tape to said substrate opposite said first-mentioned tape and in fully covering relation to said through-hole such that said two ceramic tapes cooperate with the wall of said through-hole to form a closed volume.

11. Method according to claim 1 wherein said portion of said tape that is disposed to overhang an edge portion of said substrate is in the form of a cantilever.

12. Method according to claim 11 wherein said substrate comprises a through-hole, said edge portion of said substrate is a portion of the edge of said through-hole, and said cantilever is created by removal of a portion of the tape material which overlaid said through-hole after firing of said tape to said substrate.

13. A force sensing element comprising a ceramic substrate, a ceramic tape that has been fired onto said substrate, said substrate and said tape being constructed and arranged such that a portion of said tape is disposed to overhang an edge portion of said substrate and thereby form a force sensing zone which is effective to induce measurable strain in said tape in response to force acting on said zone, and a conductor and thick film resistor system disposed on said tape so as to be effective to measure strain induced in said tape in response to force acting on said zone and thereby provide a signal thereof which is capable of electrical detection.

14. An element according to claim 13 wherein said substrate comprises a through-hole, said edge portion of said substrate comprises at least a portion of the edge of said through-hole, and said zone overlies said through-hole.

15. An element according to claim 14 wherein said through-hole's edge is endless, said zone fully covers said through-hole, and said zone is supported by an annular marginal zone of said tape bounding said through-hole.

16. An element according to claim 15 wherein said through-hole is circular.

17. An element according to claim 14 wherein the thick film resistor portion of said system is disposed on said zone.

18. An element according to claim 17 wherein said thick film resistor portion and said conductor portion of said system are arranged on said tape to cooperatively form a Wheatstone bridge, with two diametrically opposite thick film resistor elements disposed at the edge of said through-hole and with two other diametrically opposite thick film resistor elements arranged at 90 degrees to the first-two-mentioned resistor elements and disposed more radially inwardly toward the center of said through-hole, said four resistor elements being disposed on the opposite side of said tape from said through-hole.

19. An element according to claim 14 including another ceramic tape united to said substrate opposite said first-mentioned tape and in fully covering relation to said through-hole such that said two ceramic tapes cooperate with the wall of said through-hole to form a closed volume.

20. An element according to claim 13 wherein said portion of said tape that is disposed to overhang an edge portion of said substrate is in the form of a cantilever.

21. An element according to claim 13 wherein said substrate comprises a plurality of laminated ceramic tapes that have been fired together.

* * * * *